Nov. 24, 1964

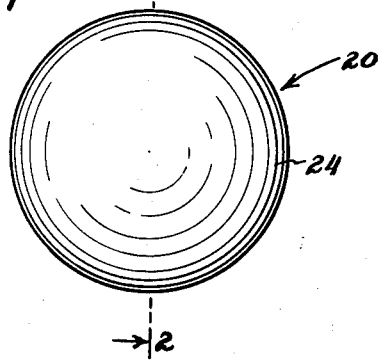
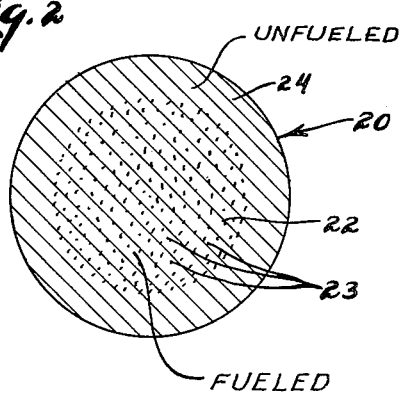
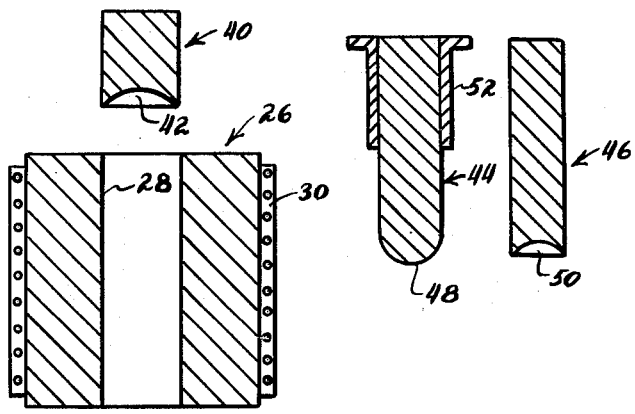
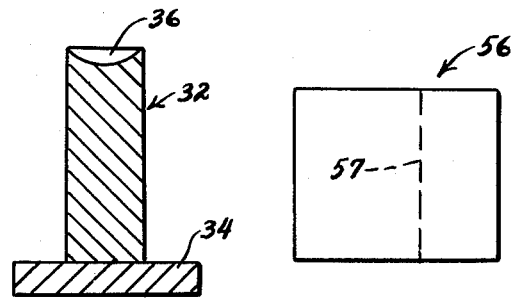
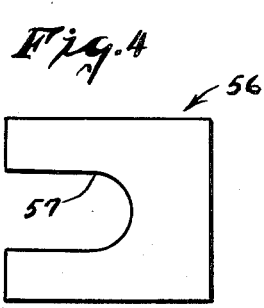

M. J. SMITH 3,158,547

METHOD OF ENCAPSULATING A GRAPHITE BODY CONTAINING
METALLIC AND CERAMIC PARTICLES

Filed June 30, 1961

INVENTOR.
Mark J. Smith
BY Emery, Whittemore
Sandoe & Graham
ATTORNEYS

United States Patent Office 3,158,547
Patented Nov. 24, 1964

3,158,547
METHOD OF ENCAPSULATING A GRAPHITE BODY CONTAINING METALLIC AND CERAMIC PARTICLES
Mark J. Smith, Wilson, N.Y., assignor, by mesne assignments, to Air Reduction Company, Incorporated, a corporation of New York
Filed June 30, 1961, Ser. No. 121,041
21 Claims. (Cl. 176—69)

This invention relates to encapsulated fuel elements and to methods for making them.

One object of the invention is to provide a fuel element having an inner matrix suitable for carrying a nuclear fuel loading, and an unfueled encapsulation of graphite material. Another object is to provide methods for making encapsulated fuel elements of the character indicated.

Features of the method relate to various steps for forming a shell into which the loaded matrix can be inserted conveniently and quickly; and to steps for completing the shell by operations performed at the same location as it is filled with the matrix.

Another object is to provide a graphite encapsulated sphere suitable as fuel or breeder or other element in a nuclear reactor. Where flash or other irregularities are on the outside of the spheres, this can be removed by tumbling or machining; and it is one of the advantages of the invention that there is no nuclear fuel in the outer shell; and the elements can be tumbled, ground or machined without damage to the fuel element.

Other objects, features and advantages of the invention will appear or be pointed out as the specification proceeds.

In the drawing forming a part hereof, in which like reference characters indicate corresponding parts in all the views, FIG. 1 is an elevation of an encapsulated fuel element made in accordance with this invention;

FIG. 2 is a sectional view taken on the line 2—2 of FIG. 1;

FIG. 3 is an exploded view of the apparatus for making the encapsulated fuel elements of this invention;

FIG. 4 is a top plan view of part of the apparatus shown in FIG. 3; and

Figure 5:
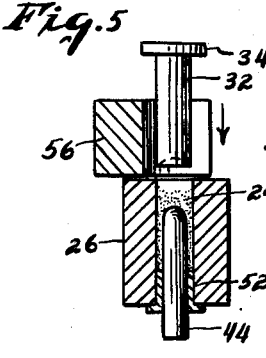
FIGS. 5–16 are diagrammatic sectional views showing successive steps of the method of this invention.

An encapsulated element 20, shown in FIGS. 1 and 2, includes an inner core 22 which is preferably spherical. The core is made from a suitable mix prepared from purified artificial graphite and coal-tar pitch in the conventional manner by crushing the constituents to a desired size and mixing at a temperature above the softening point of the pitch. To this, towards the end of the mixing cycle, is added the nuclear material which is to be encapsulated. This nuclear material, indicated by the reference character 23, may consist of particles of any uranium, plutonium, or thorium compound which does not react with carbon at the temperature utilized. These nuclear particles may be added with or without coatings of aluminum oxide, pyrolytic carbon or any other suitable containment vehicle.

This inner spherical core 22 may also be made with various sizes and proportions of either natural or artificial graphite, purified or unpurified; petroleum coke, calcined or uncalcined; naturally occuring carbonaceous materials such as coal, lignite, etc.; powdered metals; and ceramic materials with or without a binder. When a binder is used, it may include coal-tar pitches, petroleum pitches, resin binders, lignite, lignin and derivatives, and other binding and/or carbonizing substances.

The core 22 is surrounded by an outer shell or encapsulation 24 which may be of the same material as the core, but without the nuclear fuel or other loading. In the preferred construction, the encapsulation is not made of the identical composition as the core, though the composition may be considered similar.

In its broader aspects, the invention is not limited to nuclear fuel loading of the inner core, and some other loading, even an inert one, may be used in the core 22 where it is desirable to have such a core and to have it covered with a similar but unloaded material.

Outer shells 24 have been made of 100 parts graphite flour, 60% of which will pass through a 200 mesh; and 65 parts of No. 27 Barrett coal-tar pitch. The core 22 has been made of this same composition plus a 15% by volume of fused alumina 100/140 mesh. The elements have been made with the outside diameter of the core ½" and the thickness of the outer shell ⅛". These values are given merely by way of illustration, and the invention is not limited to such materials, proportions, or sizes. The actual size is restricted only by the size available, forming equipment and the intended use. It may range from a few tenths of an inch to many feet in diameter and may be cylindrical, annular, or any other shape as well as spherical.

In addition to these mixtures which comprise the matrix of the core 22, a loading material, which may be the nuclear fuel, is added.

The first step in carrying out the method of this invention is the treating of the raw material, if any treatment is needed. This treating may consist of purification of graphite, should purification by a criterion. If petroleum coke is used, the treating step may involve calcination where calcined coke is required. This treating step can be construed to include any preliminary treatment of the material to prepare it for use in the encapsulation technique.

The ingredients are preferably crushed in a jaw, roll or gyratory crusher or pulveriser to reduce the filler, and any binder, to the sizes required for the encapsulation method. Sizing by the use of graded screens or by employing air separation can be used to obtain those fractions of material which are desired. These preliminary steps are well understood in the art.

The materials are then formulated by combining the ingredients in the proportions required for the particular application. Conventional blending can be used to bring the ingredients into homogeneous association.

The mixing of the ingredients can be carried out at room temperature or at some higher temperature depending upon the degree of association of the ingredients. When thermoplastic binders are used, the mixing is preferably carried out at temperatures high enough to cause the binders to coat individual particles of the filler and any loading additive for good green state adhesion. The mixing may be accomplished by various mixing devices such as a kneading or shearing type mixer where petroleum coke and graphite fillers are included in the mix. For some types of coated particles, a solvent mixing technique may be used for both the outer shell mix and the internal matrix mix. Such a technique has the advantage of being less abrasive with respect to particle damage. It also has the advantage of obtaining homogeneity more easily.

After the mixing operation, it is desirable to crush and resize the completed mix in order to obtain a size consistency which can be conveniently handled. With this crushing and resizing step, it is desirable that the recrushing and resizing should not be carried out to a degree which results in size reduction to the original filler particle consistancy. A lower limit of particle size is to be avoided in order to prevent crushing or cracking of the filler particles which would then be deficient in binder. Approaching the lower limit of size could also damage the particles with which the matrix is loaded.

Graphite or petroleum coke flour is prepared by grinding in suitable size reduction equipment such as the Mikropulverizer to 75 microns (200 mesh) or less. The binder, a coal-tar pitch of about 30 percent benzene insoluble material, is crushed to 840 microns (20 mesh) or less.

Two separate formulations are made with the prepared materials. One, which will comprise the matrix of the final sphere 22, is made by blending together 100 parts by weight of graphite or petroleum coke flour, 65 parts by weight of pulverized coal-tar pitch, and 1 to 50 volume percent of the fuel elements or other material to be incorporated and encapsulated. Volume percent is given for the additive since a maximum loading is often preferred. If weight percent were specified, the actual volume of the loading would fluctuate considerably as determined by the density of the loading material. The second formulation, which comprises the encapsulating shell 24 of the sphere, is made by blending together 100 parts by weight of graphite or petroleum coke flour and 65 parts by weight of pulverized coal-tar pitch.

Both formulations, inner and outer blends, are thoroughly mixed in separate agitated vessels with a suitable solvent such as benzene. Other mixing techniques can be successfully utilized but most homogeneity has been experienced with solvent mixing. After a 15–30 minute mixing period, the solvent is stripped under reduced pressure and the resultant semi-dry pastes are dried at 80° C. under vacuum. The dried mixes are then gently crushed to 840 microns (20 mesh) or less, but not less than the particle diameter of either filler component. The crushed and sized inner and outer mixes are each thoroughly blended for 5 to 10 minutes in a rotary type blender.

Apparatus for making the encapsulated element of FIGS. 1 and 2 are shown in FIG. 3. It includes a die body 26 having a cylindrical cavity 28 and surrounded by a heating jacket, preferably an electric heating jacket 30. A punch 32 fits into the die cavity 28 as a piston; and this punch 32 has a base 34 at one end and a concave face 36 at the other end.

There is a complementary punch 40 that fits into the upper end of the cylindrical die cavity 28; and this punch 40 has a concave face 42 that confronts the face 36 of the punch 32. There are two other punches 44 and 46 which are of smaller diameter than the punches 32 and 40. The punch 44 has a convex face 48 and the punch 46 has a concave face 50. When these punches 44 and 46 are to be used in the die cavity 28, an alignment sleeve 52 is placed in the die.

The sleeve 52 has an outside diameter which is only slightly less than that of the die cavity 28 so that the sleeve 52 fits into the die cavity with a running fit. Each of the punches 44 and 46 fits into the alignment sleeve with a running fit.

The extent to which the punch 32 extends into the die cavity is controlled by a stop block 56 which fits over the base 34 to hold the die body 26 at a fixed elevation above the base 34. A cut-out 57 in the stop block has a U-shaped wall with the radius of curvature of the cut-out 57 equal to or slightly greater than that of the punch 32.

The procedure for making the encapsulated element of FIGS. 1 and 2, in accordance with the method of this invention, is illustrated in FIGS. 5–12.

Figure 6:
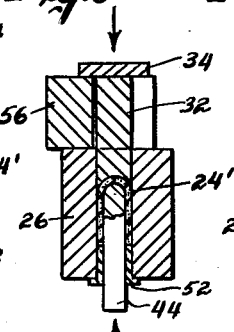

FIG. 5 shows the first step in the fabricating of the spherical element, a heated platen hydraulic press and a die assembly with heated punches are preferably used. With the punch 44 in the alignment sleeve 52 and inserted into the die cavity 28, a mix 24' for the outer shell is placed in the die cavity above the punch 44. The punch 32 is then inserted into the die cavity 28, with the stop block 56 straddling the punch 32 between the die body 26 and the base 34 of the punch 32 as shown in FIG. 6. Hydraulic pressure is applied to the punches 32 and 44 to compress the material 24' against the convex end face of the punch 44 and against the annular end face of the sleeve 52. The highest compression in this phase of the operation is against the face of the punch 44.

Figure 7:
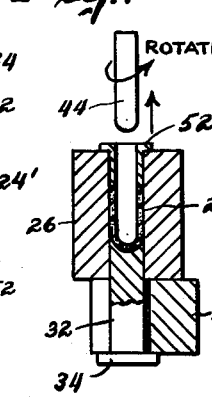

The assembly is then turned upside down into the position shown in FIG. 7; and the punch 44 is rotated to free it from any adherence to the material 30. While being rotated, the punch 44 is lifted out of the die body 26 leaving a partially formed encapsulation 24'.

Figure 8:
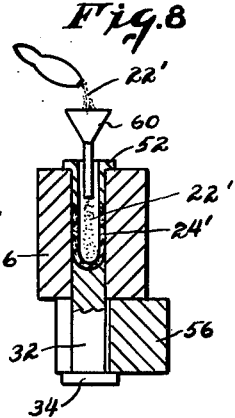

Material 22' for the core is then inserted into the partially formed encapsulation mix 24'. This core material 22' is most conveniently inserted by pouring it into a funnel 60 which extends downwardly into the die cavity 28 as shown in FIG. 8. The amount of core material 22' which is inserted into the cavity depends upon the initial density of the core material and upon the intended final density. It is permissible to use a light density core material 22' which extends above the upper edge of the partially completed encapsulation because this core mix 22' is compressed before the upwardly extending cylindrical top portion of the partially formed encapsulation mix 24' is displaced inwardly to cover the core.

Figure 9:
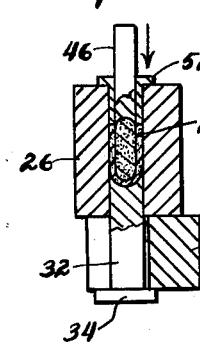
Figure 10:
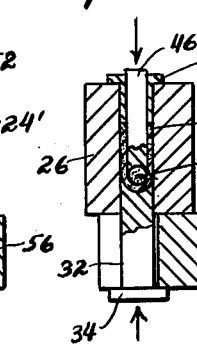

The punch 46 is then inserted into the alignment sleeve 52 as shown in FIG. 9. This punch 46 is forced downwardly in the die cavity, as shown in FIG. 10, while holding the alignment sleeve 52 against upward displacement as a result of any flow of the material in the die cavity. As a result of this downward displacement of the punch 46, the core mix 22' is compressed to an intended intermediate density.

Figure 11:
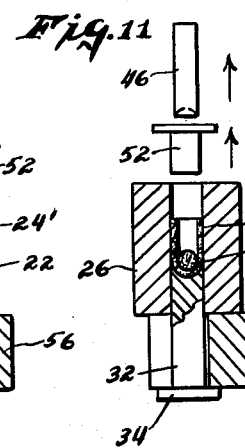

FIG. 11 shows the next step in which the punch 46 and the alignment sleeve 52 are both removed from the die body 26. The punch 46 is preferably removed first so that the alignment sleeve 52 can hold the partially formed encapsulation mix 24' down in the die cavity while the punch 46 is removed from the partially completed encapsulation. If necessary, the punch 46 and alignment sleeve 52 are given a rotary motion to free them from the material in the die cavity.

Figure 12:
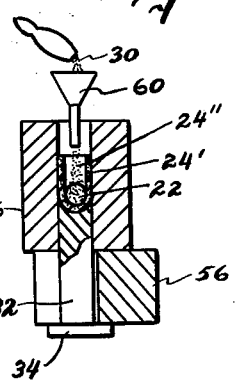

FIG. 12 shows additional encapsulating material 24" inserted into the partially formed encapsulation mix 24' through a funnel 60.

Figure 13:
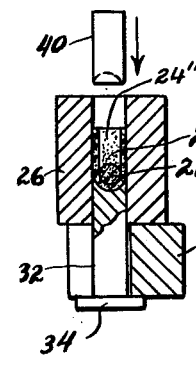

FIG. 13 shows the next step in which the punch 40 is brought into position above the die body 26 and is inserted into the upper end of the die cavity 28 above the encapsulating material 24".

Figures 14, 15:
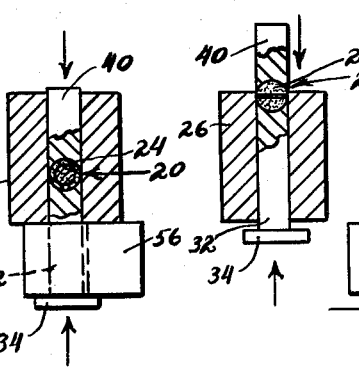

FIG. 14 shows the step in which the heated punch 40 is moved downwardly in the die cavity 28 to compress the additional encapsulating material 24" and to merge it into the original encapsulating material 24', and at the same time to displace inwardly the upwardly extending portions of the partially formed original encapsulating mix 24'. Maximum force for final pressure is applied in FIG. 14.

While it may appear from the drawings that there is more encapsulating material above the core 22 than there is below the core, it should be noted that the material above the core has not yet been compressed whereas the bottom portion of the mix 24' was compressed to an intermediate density in the step illustrated in FIG. 6. The material in the clearance between the punch 44 (FIG. 6) and the side wall of the die cavity 28 is compressed to some extent but not as much as the material located between the confronting faces of the punches 32 and 44.

Figure 16:
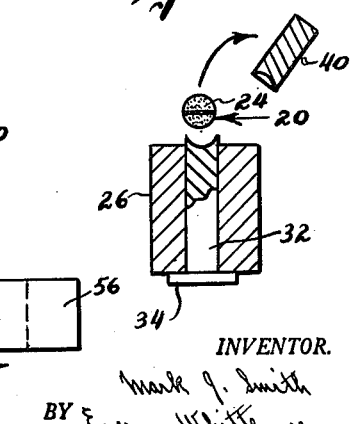

In order to remove the encapsulated element 20 from the die cavity 28, the stop block 56 is removed, as illustrated in FIG. 15, and the base 34 is moved upwardly to displace the punch 40 and the encapsulated element 20, as shown in FIG. 16. The encapsulated element then may be subjected to a high temperature for a substantial period of time to eliminate non-carbonaceous ingredients from the binder. For example, the entire mass may be baked to a temperature of 900° C. to carbonize the binder.

Following the heat treating, the encapsulated element is brought to a more nearly spherical final shape by mechanical removal of surplus portions of the outer shell. The shell is sometimes of excessive radius because of die flash or otherwise so as to require the removal step accomplished, for example, by tumbling, grinding, or machining of the shell without damage to the core as heretofore mentioned.

Although the invention and the method of making it have been illustrated and described for a spherical contour, it will be understood that other made-to-shape contours can be produced with appropriate changes in the die assembly. Terms of orientation are, of course, relative. Various other changes and modifications can be made, and some features can be used in different combinations without departing from the invention as defined in the claims.

What is claimed is:

1. An encapsulated, made-to-shape element comprising a core including compacted powder of carbonaceous material with particles of metal distributed through the compacted powder, the core having an outside surface covered by a compacted powder encapsulation of carbonaceous material free of said metal, the inside of the encapsulation being in integral union with the core and conforming precisely to the contours of said outside surface of the core whereby the encapsulation is continuous with the core over its contours so as to yield a body with no line of demarcation between the encapsulation and the metal-containing core.

2. The encapsulated element described in claim 1 characterized by the core being a mixture of compacted graphite powder and a binder forming a matrix that is loaded with the metal, and the encapsulation being an unloaded mixture of compacted graphite powder and a binder.

3. The encapsulated element described in claim 2 characterized by the binder in at least the core of the completed element being a material that is in a carbonized state.

4. The encapsulated element described in claim 2 characterized by the binder being from the group consisting of coal-tar pitches, petroleum pitches, resin binders, lignite and lignin.

5. The encapsulated element described in claim 2 characterized by both the core and the encapsulation being made of graphite mix with an organic binder which is in a carbonized state.

6. The encapsulated element described in claim 1 characterized by the metal being radioactive and the encapsulation protecting surrounding materials from contact with the radioactive metal of the core.

7. The encapsulated element described in claim 1 characterized by the carbonaceous material being from the group consisting of natural and artificial graphites, both purified and unpurified, and petroleum coke, calcined and uncalcined, coal and lignite.

8. The encapsulated element described in claim 1 characterized by the core being a loaded graphite matrix.

9. The encapsulated element described in claim 1 characterized by the particles of metal being nuclear fuel, both the core and the encapsulation being of generally spherical outside contour.

10. The encapsulated element described in claim 1 characterized by the particles of metal being coated with a carbonized coating and being distributed throughout the core as a matrix.

11. An encapsulated fuel sphere comprising a core including compacted powder of carbonaceous material loaded with damageable fuel elements which are coated and which are uniformly distributed through the compacted powder; the core having a generally spherical outside contour covered by a compacted powder encapsulation of unloaded carbonaceous material; characterized by densely associated carbonaceous material of the respective encapsulation and core pressed inwardly and outwardly respectively against one another in intimate relation as is produced at an ultimate density by co-pressing at the common ultimate compaction pressure; the encapsulation being of generally uniform thinness and conformed inherently under the co-pressure to the contour of the core, whereby the encapsulation has a generally spherical outside contour and whereby said densely associated carbonaceous material of the respective encapsulation and the core unites the encapsulation and the core in an uninterrupted subsurface region of the sphere.

12. The method of producing a made-to-shape element that contains carbonaceous material, metallic loading, and an organic binder, which method comprises the steps of mixing together powdered carbonaceous material and organic binder, without metal particles, as an encapsulating mix, forming a shell of the encapsulating mix, and leaving the shell open only at the top, mixing together powdered carbonaceous material, and organic binder and metal particles as a core mix, charging into the shell through the opening at the top a predetermined quantity of the core mix, shaping the core mix in the shell, closing the top of the shell by bringing a quantity of the encapsulating mix over the entire top of the shell, compressing the materials of the shell, core, and top into a compact unitary article of which the material of the shell and top is united intimately with the core, and performing a heating operation on the article at no less than about 900° C.

13. The method described in claim 12 and in which the core mix is crushed and resized before encapsulation and to a size less than a 20 mesh but larger than the loading particles, and in which, during the heating operation, the encapsulated element is subjected to a high temperature for a substantial period of time to eliminate non-carbonaceous ingredients from the binder.

14. The method comprising the steps described in claim 12 and in which the shell is formed with a substantial hemi-spherical bottom surface, and the top of the shell is shaped by a closing step that gives the entire encapsulated element a generally spherical shape, said forming, shaping, and molding steps imparting to said encapsulated element an encapsulating wall of generally uniform thinness.

15. In the manufacture of a nuclear fuel article made from particles and including elements of nuclear fuel, the method which comprises mixing nuclear fuel elements with powdered carbonaceous material and a binder, molding the mixture to form a core for the fuel article, encapsulating the core with a shell of another mixture of powdered carbonaceous material and binder, the other mixture being free of nuclear fuel elements, compressing the core and shell to unite their adjacent particles integrally with one another, and then removing ingredients from the binder by heating the integrally encapsulated core to a temperature no less than about 900° C.

16. In the manufacture of an encapsulated nuclear fuel element made of particles and comprising a carbonaceous core covered by a carbonaceous outer shell, the method which comprises mixing particles of nuclear fuel material through a powdered carbonaceous material and then molding the mixture to form a core of generally spherical shape, shaping a shell of carbonaceous material and binder over the core and with the outside of the shell of generally spherical shape, compressing the core and shell to unite the particles of the two intimately with one another as a unitary mass, baking the entire mass to carbonize the binder, and then bringing the encapsulated element to a more nearly spherical shape by mechanically removing the surplus portions of the outer shell where said shell is of excessive radius.

17. The method of making a nuclear fuel element which comprises mixing particles of nuclear fuel with powdered carbonaceous material and a binder, shaping the mixture under pressure to an increased density, and encapsulating the shaped mixture with another mixture of powdered carbonaceous material and binder, said encapsulating operation including the steps of molding the entire mass under pressure into a compact unitary body and then baking said body at a temperature of no less than about 900° C. to carbonize the binder, said method being characterized wherein the mixture containing the nuclear fuel is caused to take form of a generally spherical core during the aforesaid shaping operation, the encapsulation being applied in intimate relation to the core under pressure, and so applied as to have a spherical outside surface.

18. The method of making an encapsulated element that contains carbonaceous material, metallic loading, and an organic binder which method comprises mixing together powdered carbonaceous material, an organic binder and metallic loading material as a core mix, mixing together powdered carbonaceous material and organic binder, without metallic loading, as an encapsulation mix, forming a shell of encapsulation mix with the shell open only at the top, charging into the shell a quantity of the core mix limited in volume to the open interior of the shell, and closing the top of the shell by bringing encapsulation mix over the entire top of the shell, the method being further characterized by the fact that the lower portion of the shell is molded under heat and pressure to make both the inside and outside of its bottom wall of hemi-spherical contour, the inner core is molded within the shell and by top pressure applied over a hemi-spherical area to form the core to generally spherical shape, and the upper part of the shell is then closed over the spherical core and formed to a generally hemi-spherical shape.

19. The method of making a generally spherical encapsulated element which comprises shaping a mix to form a shell having a substantially hemi-spherical bottom and a cylindrical side wall, molding the shell under pressure that increases the density of the mix by pressure that reduces the thickness of the bottom and that reduces the longitudinal length of the side wall, filling the shell at least partially full of a core mix in a volume that will compress into a sphere of substantially the same radius as the inner radius of the hemi-spherical bottom of the shell, compressing and molding the core mix under pressure to substantially a spherical shape, and then closing the top of the shell by displacing the material from the upper part of the cylindrical side wall inwardly to cover the spherical core, and molding the displaced material into a top wall that completes the encapsulation of the core with a generally spherical outside surface.

20. The method described in claim 19 and in which additional mix is added to that displaced from the cylindrical side wall to provide part of the material that covers the top of the spherical core.

21. The method described in claim 19 and in which a tube is inserted into the shell from the open upper end of the shell before the core material is placed in the shell and the material for the core is then poured into the shell through said tube and with the pouring material physically confined on all sides of said tube and the tube is then withdrawn and a punch with a concave, hemi-spherical end face is brought into contact with the top of the core to compress it, and the cylindrical side wall is confined against both inward and outward displacement while compressing the core, and the pressure is maintained also on the upper annular end face of the cylindrical portion of the shell while compressing the core.

References Cited in the file of this patent

UNITED STATES PATENTS

| | | |
|---|---|---|
| 2,592,115 | Carroll | Apr. 8, 1952 |
| 2,717,225 | Williams | Sept. 6, 1955 |
| 2,907,705 | Blainey | Oct. 6, 1959 |
| 3,010,889 | Fortescue et al. | Nov. 28, 1961 |
| 3,011,960 | Williams et al. | Dec. 5, 1961 |
| 3,031,389 | Goeddel et al. | Apr. 24, 1962 |

FOREIGN PATENTS

| | | |
|---|---|---|
| 1,037,605 | Germany | Aug. 28, 1958 |

OTHER REFERENCES

1st U.N. Conference on Peaceful Uses of Atomic Energy in Geneva, August 1955, vol. 8, pp. 451–457.

2nd U.N. Conference on Peaceful Uses of Atomic Energy in Geneva, September 1958, vol. 7, pp. 748–750.

AEC Report TID 10001, October 1959.